United States Patent
Kawanishi et al.

(10) Patent No.: US 6,788,832 B2
(45) Date of Patent: Sep. 7, 2004

(54) OPTICAL MODULATOR AND OPTICAL SIGNAL AND ELECTRIC WAVE SIGNAL CONVERTER USING SAME

(75) Inventors: Tetsuya Kawanishi, Koganei (JP); Masayuki Izutsu, Koganei (JP); Satoshi Oikawa, Tokyo (JP); Kaoru Higuma, Tokyo (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 0 days.

(21) Appl. No.: 10/329,537

(22) Filed: Dec. 27, 2002

(65) Prior Publication Data

US 2003/0128417 A1 Jul. 10, 2003

(30) Foreign Application Priority Data

Dec. 28, 2001 (JP) ........................................ 2001-400078

(51) Int. Cl.[7] ............................ G02F 1/295; G02F 1/01; G02B 6/34
(52) U.S. Cl. ................................ 385/3; 385/5; 385/10; 385/37; 385/42; 385/122; 359/239; 359/276; 359/279; 398/85
(58) Field of Search ..................... 385/1, 2, 3, 5, 385/10, 37, 42, 122; 398/85; 359/239, 276, 279

(56) References Cited

U.S. PATENT DOCUMENTS 5,515,199 A  *  5/1996  Farina .......................... 359/326

FOREIGN PATENT DOCUMENTS

| JP | 5-2043 | 1/1993 |
| JP | 8-508370 | 9/1996 |
| JP | 9-51307 | 2/1997 |
| JP | 2001-24596 | 1/2001 |

OTHER PUBLICATIONS

W. K. Burns, et al., IEEE Photonics Technology Letters, vol. 10, No. 6, pp. 805–806, "Broad–Band Reflection Traveling-Wave LiNbO$_3$ Modulator", Jun. 1998.

T. Kawanishi, et al., The Institute of Electronics, Information and Communication Engineers, Technical Report of IEICE, LQE2001-3, pp. 13–18, "Resonant–Type Optical Modulator With Planar Structures", May 2001 (with English Abstract), Body of Article in Japanese.

T. Ishikawa, NHK Science and Technical Reserch Laboratories, p. 4–257, "Optical Intensity Modulator using LinbO$_3$ Waveguides for Bi–Directional Transmission" (with partial English Transiation).

* cited by examiner

Primary Examiner—Evelyn A. Lester
(74) Attorney, Agent, or Firm—Oblon, Spivak, McClelland, Maier & Neustadt, P.C.

(57) ABSTRACT

An optical modulation apparatus includes an optical signal input section, an optical signal propagation path, an optical modulator that modulates the phase of optical signals in at least two of a plurality of optical paths, and a wavelength selective filter that selectively reflects and transmits. Optical signals input via the input section are divided into a plurality of optical paths at a branching point and phase modulated by the phase modulator, that divides the optical path into a plurality of optical paths. Light transmitted by the filter is output via the output section, while light reflected by the filter travels back along the optical path and is again phase modulated by the phase modulator combined at the branching point and output from the input section as an intensity modulated optical signal.

9 Claims, 4 Drawing Sheets

OPTICAL MODULATOR AND OPTICAL SIGNAL AND ELECTRIC WAVE SIGNAL CONVERTER USING SAME

BACKGROUND OF THE INVENTION

1. Field of the Invention

The present invention relates to a high-efficiency optical modulator and to a signal converter using the optical modulator that can extract high-frequency radio signals from optical signals intensity-modulated using high-frequency radio signals in the milliwave or microwave range and radiate the extracted signals from an antenna as electric waves, and can also intensity-modulated light using high-frequency radio signals in the milliwave or microwave range.

2. Description of the Prior Art

A passive optical network (PON) uses transmissions over optical fibers to bring signals close to the end user. At the end terminal, the system transmits the signals as radio signals. PON technology is attracting attention as a way of handling broadband Internet transmissions. There is a need for optical modulation technology that, while using compact equipment, is able to use received high-frequency radio signals to modulate optical signals with high efficiency and can efficiently transmit high-frequency radio signals superimposed on the optical signals. As described below, there have already been a number of related basic inventions and announcements.

An effective method of using a received high-frequency radio signal to modulate an optical signal with improved efficiency is to increase the voltage of the high-frequency radio signal applied to the modulator or to increase the length of the optical modulation path of the modulator. Ways have also been devised for reducing the length of the optical path of the modulator. Reference 1, for example, describes an optical modulator configuration comprising a Mach-Zehnder optical modulator in which the optical path is folded at a central perpendicular segment, wherein the incident beam is split into two beams which are phase-modulated, reflected, again phase-modulated and recombined at the original branch point (Ishikawa, "Optical modulator for two-way transmissions using an LN optical waveguide," C-215, p. 4–257, Spring Conference of The Institute of Electronics, Information and Communication Engineers, 1992). In addition to the configuration of Reference 1, Reference 2 describes a modulator in which input high-frequency radio signals are reflected at one end of a divided optical path (W. Burns, et al., "Broad-Band Reflection Traveling-Wave $LiNbO_3$ Modulator," IEEE Photonics Technology Letters, Vol. 10, No. 6, 805–806, 1998). There are also disclosures of an apparatus and communication system able to extract a high-frequency radio signal from an optical signal and radiate the extracted signal from an antenna as a high-frequency radio wave.

Japanese Patent Laid-Open Publication No. Hei 8-508370 discloses a hybrid wireless communication system that uses light and high-frequency radio signals. The system uses a transducer equipped with an electrooptic detector that does not use electric power, and a radio antenna. The electrooptic detector is electrically connected directly to the radio antenna and can receive optical signals via the transducer without using electric power, and transmit radio signals. The transducer can therefore operate without a supply of electricity, such as in a remote region.

Japanese Patent Laid-Open Publication No. 2001-24596 discloses a radio apparatus and communication system in which the radio transmission signals are amplified. High-frequency modulated optical signals sent from a transmitter are converted to high-frequency electric signals by an electrooptic conversion element to which a bias voltage from a bias voltage power supply is applied. The system outputs high-frequency electric signals that is directly applied to a transmit antenna without an amplifier for emitting radio wave. The publication describes an antenna for receiving external electric waves, an optical modulator that, in accordance with the waves thus received, modulates light from the light source transmitted via an outbound path, and an inbound path that transmits the light thus modulated. The publication also describes using a solar battery to generate the bias voltage.

The following disclosures relate to apparatuses that can modulate light using a high-frequency radio signal such as a milliwave or microwave frequency signal received via an antenna.

First, a field sensor able to measure the waveform of an electromagnetic wave that includes a broadband frequency component is disclosed by Japanese Patent Laid-Open Publication No. Hei 5-2043. A source light signal is guided to an optical modulator by an polarization-maintaining optical fiber and is modulated by an electro-optic crystal, using an electric field detected by a sensor rod. The modulated signal is guided by a single-mode fiber to an optical detector and converted to an electric signal that is measured by a voltage measuring device.

Japanese Patent Laid-Open Publication No. Hei 9-51307 discloses a modulation apparatus used for information communication applications that performs electro-optical conversion. The apparatus has a small, flat electro-optical conversion section for directly converting radio signals to optical signals. The apparatus includes a substrate that exhibits an electro-optic effect, at least one pair of optical waveguides formed on the substrate that are parallel but ultimately merge, electrodes formed on the optical waveguide that function as an external spatial field signal detector antenna, a light source and optical fiber for supplying light to the optical waveguide, an optical detector for detecting light exiting the optical waveguide, and an optical signal receiver. The apparatus uses an external spatial field signal to directly modulate light that passes through the waveguide.

However, the above disclosures differ from the present invention, as described below.

First, the present invention differs from the References 1 and 2 in that the References do not improve the modulation efficiency by again modulating modulated light reflected back by the optical path. The prior art system disclosed by Published Japanese translation of PCT international publication for patent application(Japanese Patent Laid-Open Publication) No. Hei 8-508370 is configured to convert optical signals to radio signals, but differs from the present invention in that the prior art system is not configured to convert radio signals to optical signals and transmit the converted signals.

The radio apparatus and communication system disclosed by Japanese Patent Laid-Open Publication No. 2001-24596 use a configuration for converting radio signals to optical signals, and thus differs from the present invention with respect to the incorporation of a configuration that converts optical energy to electrical energy.

Similarly, the electro-optical conversion and modulation apparatus of Japanese Patent Laid-Open Publication No. Hei 5-2043 differs from the present invention, which uses a different modulator in converting radio signals to optical signals.

The system disclosed by Japanese Patent Laid-Open Publication No. Hei 9-51307 includes the ability to convert optical signals to radio signals, but differs from the present invention in that it does not include the function of converting radio signals to optical signals.

References 1 and 2 describe an optical modulator configuration in which light that has been modulated is reflected back to the same modulator to be modulated a second time. Also, a resonant type optical modulator is described by Reference 3 (Kawanishi, et al., "Resonant type optical modulator having a planar structure," The Institute of Electronics, Information and Communication Engineers [Communication Techniques], 2000-05). However, these do not mention applying the modulators to a transmitters and receivers.

SUMMARY OF THE INVENTION

Thus, to date there have been various disclosures such as described above. However, electro-optic signal conversion systems using conventional PON technology employ standing wave type optical modulators, in which the length of the optical path has to be increased in order to obtain adequately modulated optical signals.

An object of the present invention is therefore to provide a high-efficiency optical modulator by using an optical modulator having a high modulation efficiency per unit length of optical path. Another object is to provide an apparatus using the optical modulator that converts between optical signals and electric wave signals.

The present invention uses a configuration in which an optical waveguide is divided into two optical waveguides, each of which is terminated by an optical filter. Light transmitted by one filter is guided to an optical detector having a frequency response that extends up to a high frequency, and light transmitted by the other optical filter is guided to an optical detector having a low frequency response. The output from the former filter goes to a transmission antenna, and the output from the latter filter is used as a DC power supply for the modulator's bias controller and amplifier. An optical phase modulator is provided midway along the two optical waveguides, forming a folded Mach-Zehnder type of optical modulator configuration. The optical phase modulator is a resonant type. The optical wavelength used when converting optical signals to radio signals is different from the wavelength used when converting radio signals to optical signals. The former wavelength is transmitted by the optical filter and the latter wavelength is reflected by the optical filter. The reflected light again passes through the optical modulator at a time interval that is an inverse integer multiple of the frequency of the high-frequency radio signal, making it possible to maintain a high modulation efficiency. The high-frequency radio signals received via the antenna are amplified and supplied to the optical modulator. The same antenna can be used for reception and transmission.

In accordance with a first aspect of the invention, the above object is attained by an optical modulation apparatus comprising an optical signal input section, an optical path that propagates the optical signals, a branching portion that divides the optical path into a plurality of optical paths, an optical modulator that phase modulates optical signals in at least one of said plurality of optical paths, a wavelength selective filter that selectively reflects and transmits light, a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from a center of the optical modulator; and a structure whereby an optical signal input from the input section that is divided into a plurality of optical paths at the branching portion, phase modulated by a phase modulator, reflected by the filter back along the optical path and again phase modulated by the phase modulator is combined at the branching portion and output from the input section as an intensity modulated optical signal.

The second aspect provides an optical modulation apparatus comprising an optical signal input section, an optical path that propagates the optical signals, a branching portion that splits the optical path into a plurality of optical paths, an optical modulator that phase modulates optical signals in at least one of said plurality of optical paths, a wavelength selective filter that selectively reflects and transmits light: a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from the optical modulating electrode feeding point; and a structure whereby an optical signal input from the input section that is divided into a plurality of optical paths at the branching portion, phase modulated by a phase modulator, reflected by the filter back along the optical path and again phase modulated by the phase modulator is combined at the branching portion and output from the input section as an intensity modulated optical signal.

The third aspect of the invention provides an optical modulation apparatus comprising an optical signal input section, an optical path that propagates the optical signals, a branching portion that splits the optical path into a plurality of optical paths, an optical modulator that phase modulates optical signals in at least one of said plurality of optical paths, a wavelength selective filter that selectively reflects and transmits light; an output section that outputs an optical signal transmitted by the filter; a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from the center of the optical modulator; a structure whereby an optical signal input from the input section that is divided into a plurality of optical paths at the branching portion, phase modulated by a phase modulator and transmitted by the filter is output from the output section, and a structure whereby light that is reflected by the filter back along the optical path and again phase modulated by the phase modulator is combined at the branching portion and output from the input section as an intensity modulated optical signal.

The fourth aspect of the invention provides an optical modulation apparatus comprising an optical signal input section, an optical path that propagates the optical signals, a branching portion that splits the optical path into a plurality of optical paths, an optical modulator that phase modulates optical signals in at least one of said plurality of optical paths, a wavelength selective filter that selectively reflects and transmits light; an output section that outputs an optical signal transmitted by the filter; a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from the optical modulating electrode feeding point; a structure whereby an optical signal input from the input section that is divided into a plurality of optical paths at the branching portion, phase modulated by a phase modulator and transmitted by the filter is output from the output section, and a structure whereby light that is reflected by the filter back along the optical path and again phase modulated by the phase modulator is combined at the branching portion and output from the input section as an intensity modulated optical signal.

In accordance with a fifth aspect, an optical signal of a first wavelength transmitted by the filter and an optical signal of a second wavelength reflected by the filter are input to the optical modulation apparatus.

In accordance with a sixth aspect, the optical modulator has a resonant type modulation portion.

In accordance with a seventh aspect, the modulator comprises a plurality of modulation portions disposed in series, at least one of which performs low-frequency signal modulation and another of which performs high-frequency radio signal modulation.

In accordance with an eighth aspect, the modulation apparatus includes transmission means for transmitting at least a portion of the optical signals output from the output section, receiving means for receiving a high-frequency radio signal, and modulation means that uses the optical modulator to modulate light with the high-frequency radio signal.

In accordance with a ninth aspect, the modulation apparatus further comprises an electrooptic converter that converts a portion of the light output from the output section to electrical energy that is supplied to transmission means, receiving means and modulation means.

Further features of the invention, its nature and various advantages will be more apparent from the accompanying drawings and following detailed description of the invention.

DESCRIPTION OF THE PREFERRED EMBODIMENT

Figure 1:
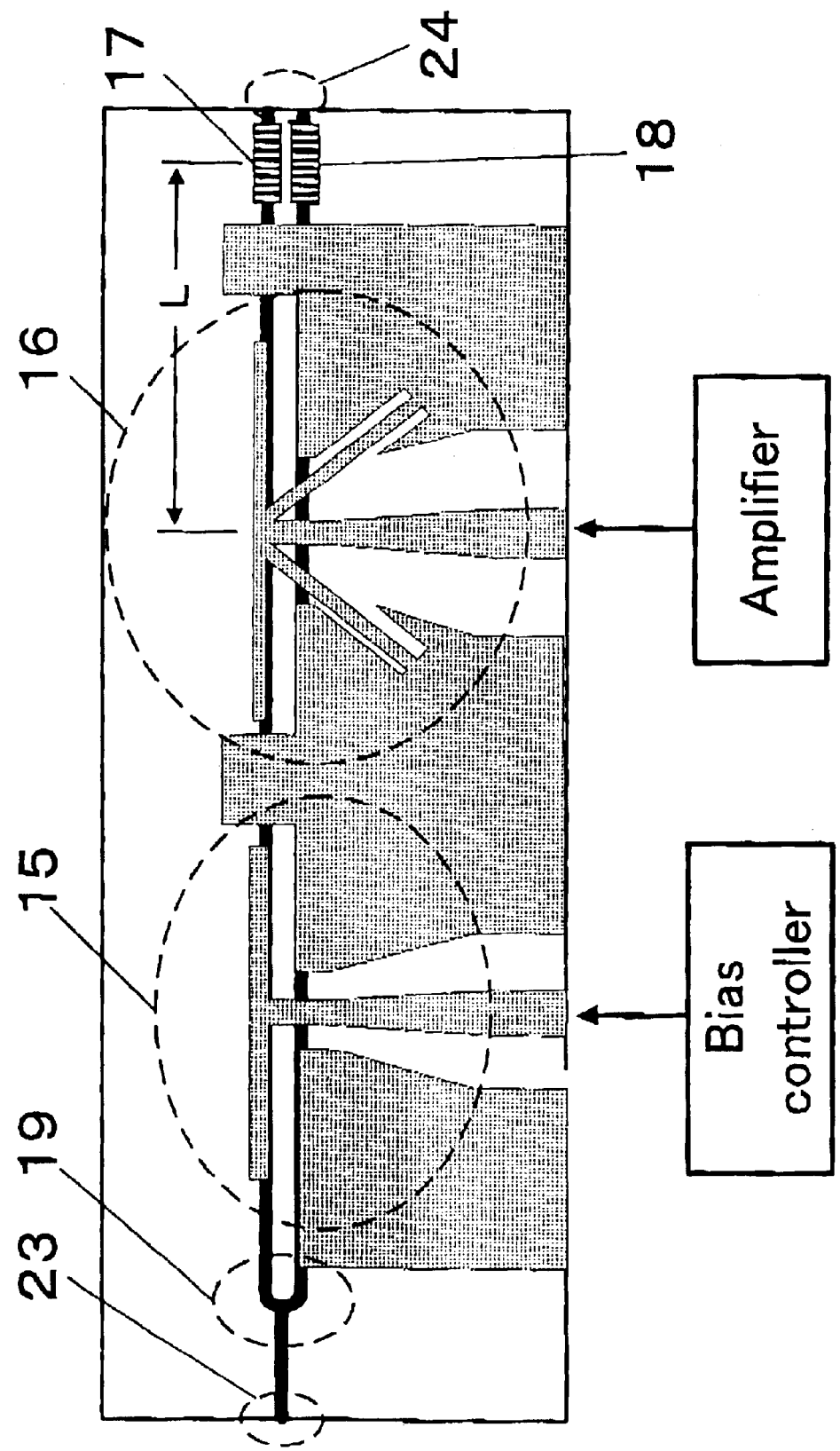
FIG. 1 shows a modulation section in which two modulators are connected in series.
Figure 2:
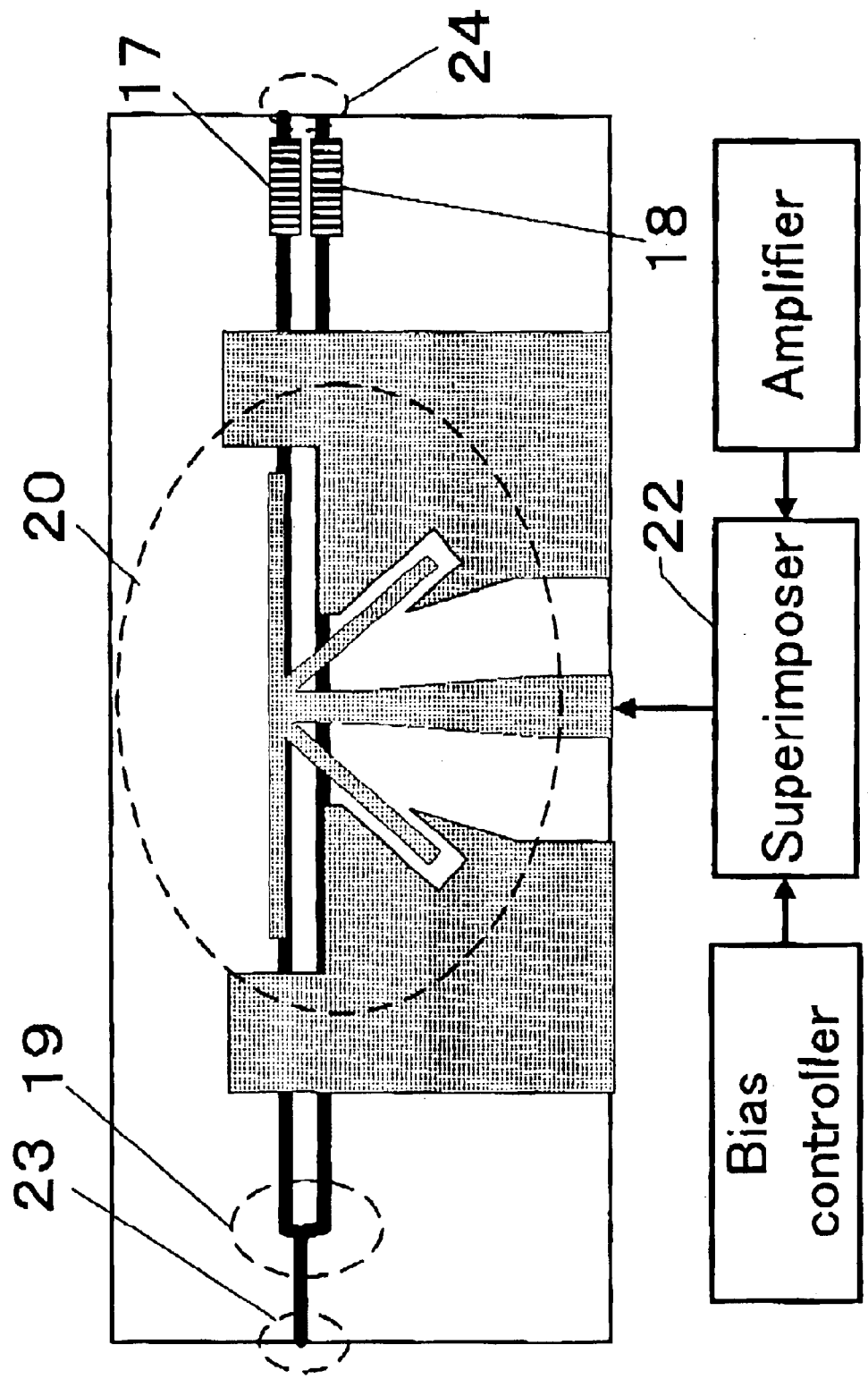
FIG. 2 shows a modulation section comprising a single modulator.
Figure 3:
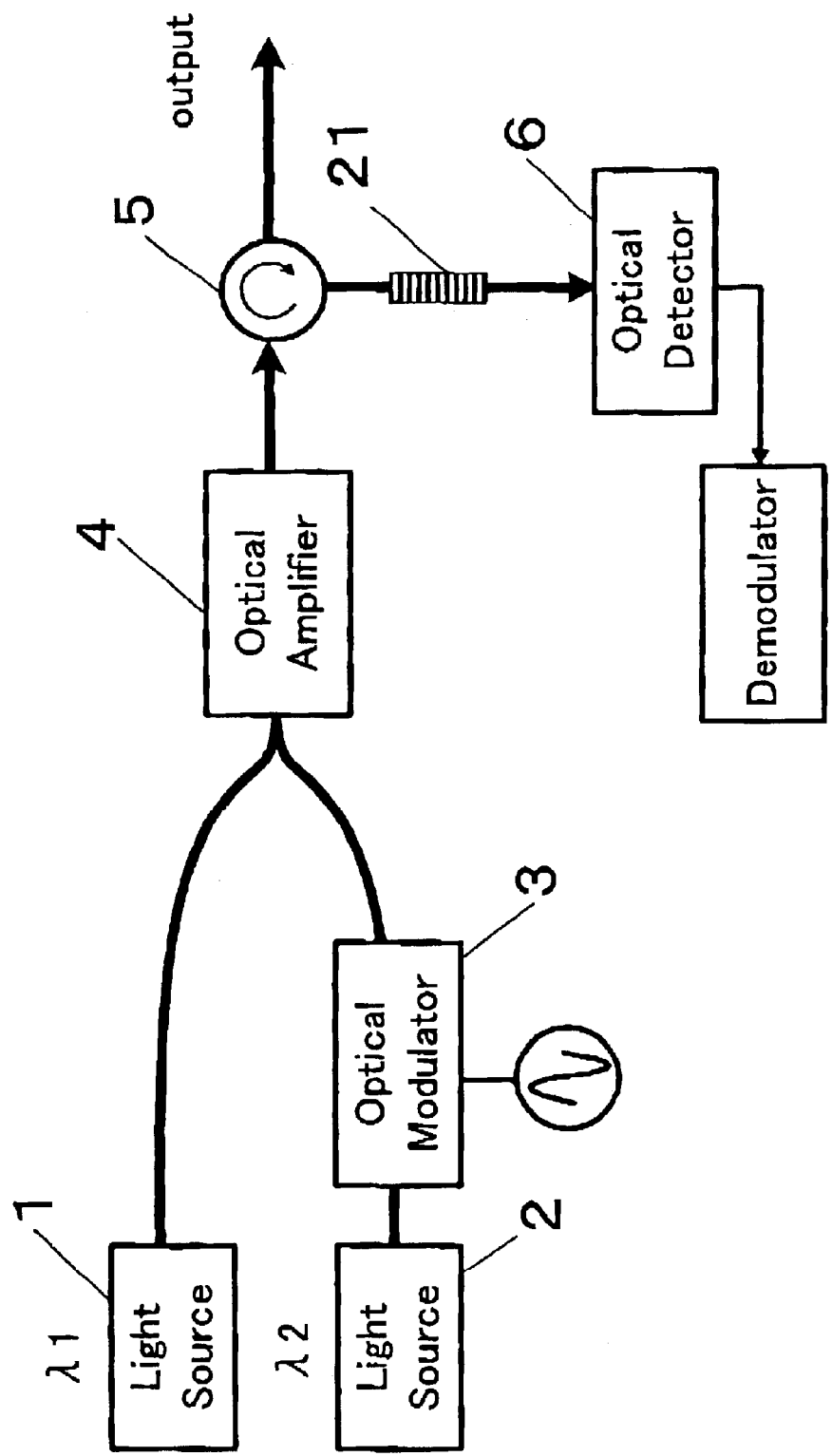
FIG. 3 is a block diagram of the configuration of a central station.
Figure 4:
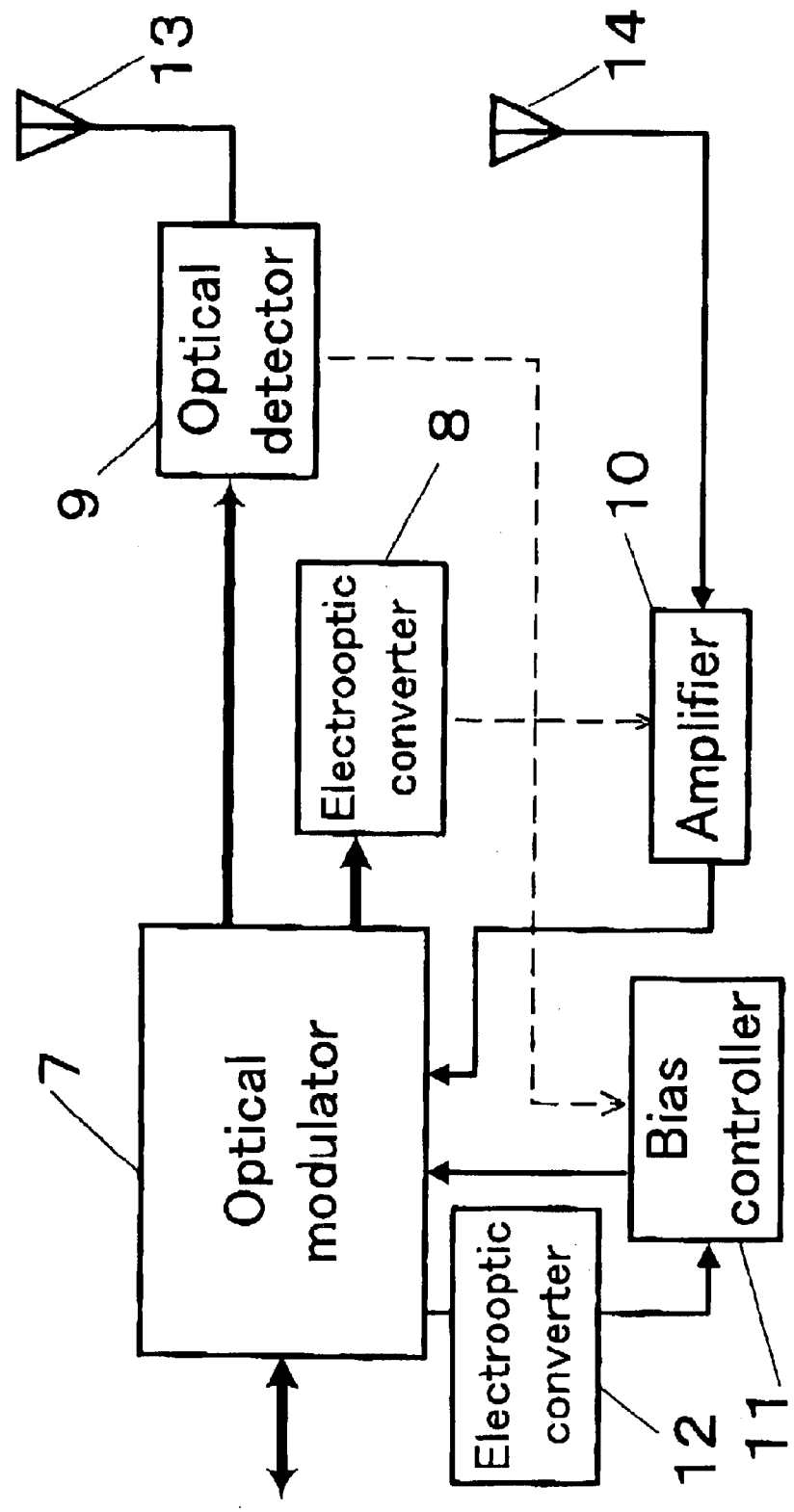
FIG. 4 is a block diagram of the configuration of a terminal station.

Aspects of the invention will now be described in detail with reference to the drawings. FIGS. 1 and 2 are schematic diagrams of an optical modulator, and FIGS. 3 and 4 are block diagrams of the apparatuses used to transmit and receive radio wave signals.

The optical modulator 7 used here has a Mach-Zehnder type folded optical modulator configuration, shown in FIG. 1. The optical modulator shown in FIG. 1 includes an input section 23, a branching portion 19, a phase-shift section 15, a phase-modulation section 16, wavelength selective optical filters 17 and 18 that reflect a portion of the light and an output section 24 on a $LiNbO_3$ substrate. Light input via the input section 23 is output from the output section 24. The optical filters are the type known as fiber Bragg grating (FBG) filters. The optical filters 17 and 18 selectively transmit light of wavelength $\lambda 2$ and reflect light that is not transmitted. Thus, the optical filters 17 and 18 function as filters with respect to light transmitted by the filters, and as reflectors with respect to light not transmitted by the filters. A bias controller 11 applies a signal to the phase-shift section 15, which adjusts the optical phase. Received signals from an amplifier 10 are applied to the phase-modulation section 16. In terms of structure, the phase-shift section 15 and phase-modulation section 16 are resonant-type phase modulators. However, any other type of phase modulator capable of providing adequate phase-modulation can be used instead.

The optical modulator shown in FIG. 1 includes the phase-shift section 15 for adjusting the light phase in accordance with an applied bias voltage. Feedback is applied to the bias voltage to ensure that light reflected by filter 17 or 18 that is phase modulated and recombined at the branching portion 19 has sufficient intensity to be detected by electrooptic converter 12. The change in the bias voltage is in a frequency range that is lower than that of the high-frequency radio signals.

In FIG. 1, if L is the distance from the phase-modulation section 16 to the reflection center, c is the speed of light, n is the refractive index of the optical waveguide path, f is the frequency of the received high-frequency radio signal and N is a natural number, by setting L to satisfy $$2 \times L \times n \times f = N \times c$$

in the length dimension, or $$2 \times (L/(c/n)) = N/f$$

in the time dimension, light reflected back along the optical path undergoes the same phase shift as in round-trip propagation, making it possible to achieve efficient phase modulation. This relationship does not have to rigorously hold true; viewed from the modulating electrode center or feeding point, the light can be returned back along the optical path without reducing the phase shift effect provided the time difference is within a quarter period plus or minus. The point that should be taken as the center differs depending on the shape of the modulating electrodes. It is desirable to use the center of the modulating electrode in the case of electrodes that are bilaterally symmetrical, and the feeding point in the case of electrodes that are not bilaterally symmetrical.

While the optical modulator of FIG. 1 includes a phase-shift section 15 and phase-modulation section 16, the phase-shift section 15 can be omitted if the optical modulator has the phase modulation section 20 shown in FIG. 2. The optical modulator of FIG. 2 includes an input section 23, a branching portion 19, the phase modulation section 20, wavelength selective optical filters 17 and 18 that reflect a portion of the light, and an output section 24. Light is input via the input section 23 and output via the output section 24. However, in the case of this configuration a superimposer 22 or the equivalent is required for superposing the bias voltage signal provided from the bias controller for the phase shifting, on the high-frequency radio signal voltage used for modulation. In terms of structure, the phase modulation section 20 is a resonant-type phase modulator. However, any other type of phase modulator capable of providing adequate phase-modulation can be used instead of this modulator.

The configuration for sending and receiving radio wave signals will now be explained. The central station configuration of FIG. 3 includes a light source 1 (wavelength=λ1) for generating a light beam for modulating with a received electric wave, a light source 2 (wavelength=λ2) for generating a light beam that is modulated by a high-frequency radio signal, an optical modulator 3 for modulating the light from the light source 2 with the high-frequency radio signal, an optical amplifier 4 for amplifying, if necessary, the light formed by combining the wavelength λ1 light with the wavelength λ2 modulated light, a circulator 5 that controls the direction in which the light beam is transmitted, and outputting the light from the circulator 5, and a configuration that includes an optical detector 6 for detecting signals overlaid with light from another circulator 5, and outputting electric signals from the optical detector 6 to a demodulator.

FIG. 4 is used to explain the configuration of one of a numerous plurality of terminal stations that includes a conversion function for converting optical signals and optical energy sent from the central station to high-frequency radio signals and electrical energy, and the function of sending back a high-frequency radio signal received at the terminal station, superposed on an optical signal. For this, there is a configuration that has an optical modulator 7, an optical detector 9 that converts optical signals from the optical modulator 7 to high-frequency radio signals and, if necessary, amplifies the signals, a transmission antenna 13 for transmitting the output of the optical detector 9, an electrooptic converter 8 for converting optical signals from the optical modulator 7 to electrical energy, a bias controller 11 for generating bias voltage to be applied to the optical modulator 7, an electrooptic converter 12 that is used to adjusts automatically the bias voltage, a receiving antenna 14 for receiving high-frequency radio wave signals, an amplifier 10 that, if necessary, amplifies received high-frequency radio wave signals and supplies the amplified signals to the optical modulator 7, and, if required, a configuration for supplying electrical energy generated by the electrooptic converter 8 to the optical detector 9, amplifier 10, bias controller 11 and so forth.

A case will now be explained in which the above configuration is used to optically transmit to a remote location, high-frequency electric signals in the form of high-frequency radio signals.

In FIG. 3, with λ1=1550 nm and λ2=1560 nm, for example, the high-frequency electric signal is a 1 GHz band signal in the vicinity of 10 GHz. A beam of wavelength λ1 from the light source 1 is amplified if necessary, and directed to the output side by the circulator 5 without being modulated. Similarly, a beam of wavelength λ2 from the light source 2 is intensity modulated by the high-frequency electric signal, amplified if necessary, and directed to the output side by the circulator 5. The beams propagated by optical fiber or free space are input to the terminal station at the remote region. The beams input to the terminal station are input via the input section 23 of the optical modulator 7, through which the beams pass. In the course of this, part of the light is transmitted by optical filter 17 or optical filter 18. In its passage through the optical modulator 7, the light is phase modulated but not intensity modulated, so the output of the optical detector 9 is not affected. The optical filter 17 is set to transmit light of wavelength λ2, so in the optical detector 9 the high-frequency radio signal is demodulated, then amplified if necessary, and transmitted by the transmission antenna. Light transmitted by the optical filter 18 is converted to electrical energy by a photoelectric cell and supplied to the optical detector 9, amplifier 10, bias controller 11, and so forth.

The high-frequency radio signal received by the receiving antenna 14 is amplified if necessary, and supplied to the phase-modulation section 16 of the optical modulator 7. At the phase-modulation section 16, the beams going to the optical filter 17 and optical filter 18 are phase modulated, and light reflected by the optical filters 17 and 18 is phase modulated, combined at the branching portion 19 and output from the input section 23, so that intensity modulated light is output from the terminal station and propagated back to the central station via optical fiber or free space. The light thus input at the central station is directed towards the optical path of the optical detector 6 by the circulator 5, but before reaching the optical detector 6, light of wavelength λ1 is selected by optical filter 21 and the received signal by the receiving antenna 14 is demodulated.

The present invention configured as described in the foregoing has the following effects.

In accordance with the first and third aspects of the invention, the optical signal and electric wave signal conversion apparatus comprises an optical signal input section, an optical path that propagates the optical signals, a branching portion that divides the optical path into a plurality of optical paths, an optical modulator that phase modulates optical signals in at least one of said plurality of optical paths, a wavelength selective filter that selectively reflects and transmits light; a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from a center of the optical modulator; and a structure whereby an optical signal input from the input section that is divided into a plurality of optical paths at the branching portion, phase modulated by a phase modulator, reflected by the filter back along the optical path and again phase modulated by the phase modulator is combined at the branching portion and output from the input section as an intensity modulated optical signal. Thus, the light is reflected so that it passes through the modulator twice to achieve a high modulation efficiency.

In accordance with the second and fourth aspects, the optical modulation apparatus comprises an optical signal input section, an optical path that propagates the optical signals, a branching portion that splits the optical path into a plurality of optical paths, an optical modulator that phase modulates optical signals in at least one of said plurality of optical paths, a wavelength selective filter that selectively reflects and transmits light; a structure whereby an appropriate time within a range having a lower limit obtained by subtracting one-fourth of an integer multiple of a high-frequency radio signal period applied to the optical modulator and an upper limit obtained by adding one-fourth of the integer multiple of said period is equal to twice the time it takes an optical signal to reach the filter from the optical modulating electrode feeding point; and a structure whereby an optical signal input from the input section that is divided into a plurality of optical paths at the branching portion, phase modulated by a phase modulator, reflected by the filter back along the optical path and again phase modulated by the phase modulator is combined at the branching portion and output from the input section as an intensity modulated optical signal. So, again the light is reflected so that it passes through the modulator twice, providing a high modulation efficiency.

In accordance with the fifth aspect, an optical signal of a first wavelength transmitted by the filter and an optical signal of a second wavelength reflected by the filter are input to the optical modulation apparatus, making it possible to transmit signal and energy along the same optical transmission path.

In accordance with the sixth aspect, the optical modulator has a resonant type modulation portion, enabling modulation with good efficiency.

In accordance with the seventh aspect, the modulator comprises a plurality of modulation portions disposed in series, at least one of which performs low-frequency signal modulation and another of which performs high-frequency radio signal modulation.

In accordance with the eighth aspect, the modulation apparatus includes transmission means for transmitting at least a portion of the optical signals output from the output section, receiving means for receiving a high-frequency radio signal, and modulation means that uses the optical modulator to modulate light with the high-frequency radio signal, thereby realizing an apparatus for converting optical signals and electric wave signals.

And in accordance with the ninth aspect, the modulation apparatus also includes an electrooptic converter that converts a portion of the light output from the output section to electrical energy that is supplied to transmission means, receiving means and modulation means, eliminating the need to provide the terminal station with an external power supply.

What is claimed is:

1. An optical modulation apparatus comprising:

an optical signal input section;

an optical path that propagates the optical signals;

a branching portion that divides said optical path into a plurality of optical paths;

an optical modulator that phase modulates said optical signals in at least one of said plurality of optical paths;

a wavelength selective optical filter that selectively reflects and selectively transmits said optical signals, said filter having a reflection center a distance L from a center of said optical modulator, wherein L satisfies $(N-1/4)(c/f)/(2n) < L < (N+1/4)(c/f)/(2n)$, c is a speed of light, n is a refractive index of an optical waveguide path, f is a frequency of a received high-frequency radio signal, and N is a natural number; and a structure for combining at said branching portion signals, into which an optical signal input from said input section is divided at said branching portion, and which are phase-modulated by said optical modulator, reflected by said optical filter back along said optical path and again phase-modulated by said optical modulator, and outputting a combined signal from said input section as an intensity-modulated optical signal.

2. An optical modulation apparatus comprising:

an optical signal input section;

an optical path that propagates the optical signals;

a branching portion that divides said optical path into a plurality of optical paths;

an optical modulator that phase modulates said optical signals in at least one of said plurality of optical paths;

a wavelength selective optical filter that selectively reflects and selectively transmits said optical signals, said filter having a reflection center a distance L from an optical modulating electrode feeding point of said optical modulator, wherein L satisfies $(N-1/4)(c/f)/(2n) < L < (N+1/4)(c/f)/(2n)$, c is a speed of light, n is a refractive index of an optical waveguide path, f is a frequency of a received high-frequency radio signal, and N is a natural number;

a structure for combining at said branching portion signals, into which an optical signal input from said input section is divided at said branching portion, and which are phase-modulated by said optical modulator, reflected by said optical filter back alone said optical path and again phase-modulated by said optical modulator, and outputting a combined signal from said input section as an intensity-modulated optical signal.

3. An optical modulation apparatus comprising:

an optical signal input section;

an optical path that propagates the optical signals;

a branching portion that divides said optical path into a plurality of optical paths;

an optical modulator that phase modulates said optical signals in at least one of said plurality of optical paths;

a wavelength selective optical filter that selectively reflects and selectively transmits said optical signals characteristics, said filter having a reflection center a distance L from a center of said optical modulator, wherein L satisfies $(N-1/4)(c/f)/(2n) < L < (N+1/4)(c/f)/(2n)$, c is a speed of light, n is a refractive index of an optical waveguide path, f is a frequency of a received high-frequency radio signal, and N is a natural number;

an output section that outputs an optical signal transmitted by said optical filter; and a structure for combining at said branching portion signals, into which an optical signal input from said input section is divided at said branching portion, and which are phase-modulated by said optical modulator, reflected by said optical filter back alone said optical path and again phase-modulated by said optical modulator, and outputting a combined signal from said input section as an intensity-modulated optical signal.

4. An optical modulation apparatus comprising:

an optical signal input section;

an optical path that propagates the optical signals;

a branching portion that divides said optical path into a plurality of optical path;

an optical modulator that phase modulates said optical signals in at least one of said plurality of optical paths;

a wavelength selective optical filter that selectively reflects and selectively transmits said optical signals, said filter having a reflection center a distance L from an optical modulating electrode feeding point of said optical modulator, wherein L satisfies $(N-1/4)(c/f)/(2n) < L < (N+1/4)(c/f)/(2n)$, c is a speed of light, n is a refractive index of an optical waveguide path, f is a frequency of a received high-frequency radio signal, and N is a natural number;

an output section that outputs an optical signal transmitted by said optical the filter; and a structure for combining at said branching portion signals, into which an optical signal input from said input section is divided at said branching portion, and which are phase-modulated by said optical modulator, reflected by said optical filter back alone said optical path and again phase-modulated by said optical modulator, and outputting a combined signal from said input section as an intensity-modulated optical signal.

5. An optical modulation apparatus according to any of claims 1 to 4, wherein an optical signal of a first wavelength transmitted by the filter and an optical signal of a second wavelength reflected by the filter are input to the optical modulation apparatus.

6. An optical modulation apparatus according to claim 5, wherein the optical modulator has a resonant modulation portion.

7. An optical modulation apparatus according to claim 5, wherein the modulator comprises a plurality of modulation portions disposed in series, at least one of which performs low-frequency signal modulation and another of which performs high-frequency signal modulation.

8. An optical modulation apparatus according to claim 5, wherein the modulation apparatus includes transmission means for transmitting at least a portion of the optical signals output from the output section, receiving means for receiving a high-frequency radio signal, and modulation means that uses the optical modulator to modulate light with the high-frequency radio signal.

9. An optical modulation apparatus according to claim 5, wherein the modulation apparatus further includes an electrooptic converter that converts a portion of the light output from the output section to electrical energy that is supplied to transmission means, receiving means and modulation means.

* * * * *